United States Patent
Drysdale et al.

(10) Patent No.: US 6,942,480 B2
(45) Date of Patent: Sep. 13, 2005

(54) APPARATUS FOR HANDLING INJECTION MOLDED ARTICLES

(75) Inventors: Barrie Lloyd Drysdale, Puslinch (CA); Matthew Dee Tai, Toronto (CA); Alireza Mortazavi, Richmond Hill (CA); Gordon Elliott, Toronto (CA); Bruce Clive Dearling, Strassen (LU)

(73) Assignee: Husky Injection Molding Systems, Ltd., Bolton (CA)

( * ) Notice: Subject to any disclaimer, the term of this patent is extended or adjusted under 35 U.S.C. 154(b) by 274 days.

(21) Appl. No.: 10/280,080

(22) Filed: Oct. 25, 2002

(65) Prior Publication Data
US 2003/0091681 A1 May 15, 2003

Related U.S. Application Data

(63) Continuation-in-part of application No. 09/877,680, filed on Jun. 8, 2001, now abandoned.
(60) Provisional application No. 60/267,859, filed on Feb. 9, 2001.

(51) Int. Cl.[7] .............................................. B29C 45/72
(52) U.S. Cl. ...................... 425/526; 249/79; 425/445; 425/534; 425/547
(58) Field of Search ............................. 425/526, 534, 425/547, 445; 198/465.2, 728; 249/79

(56) References Cited

U.S. PATENT DOCUMENTS 4,687,093 A * 8/1987 Marshall et al. .......... 198/465.2
6,156,258 A * 12/2000 Takada et al. ............... 425/534
6,273,239 B1 * 8/2001 Crunkelton .................. 198/728

FOREIGN PATENT DOCUMENTS

WO     WO 00/61350     10/2000

* cited by examiner

Primary Examiner—Tim Heitbrink
(74) Attorney, Agent, or Firm—Katten Muchin Rosenman LLP

(57) ABSTRACT

A method and apparatus for handling preforms from an injection molding machine whereby an array of molded articles received from the mold is reconfigured into a single row to assist in downstream auxiliary processing.

10 Claims, 9 Drawing Sheets

APPARATUS FOR HANDLING INJECTION MOLDED ARTICLES

CROSS-REFERENCE TO RELATED APPLICATIONS

This application is a continuation-in-part of an application entitled "System and Apparatus for Injection Molding Articles with Reduced Crystallization", U.S. patent application Ser. No. 09/877,680, filed Jun. 8, 2001, now abandoned which claims the benefit of priority from U.S. Provisional Application No. 60/267,859, filed Feb. 9, 2001.

BACKGROUND OF THE INVENTION

1. Field of the Invention

This invention relates generally to the handling of injection molded articles. More particularly, the invention relates to a method and apparatus for handling injection molded articles of substantially amorphous polyethylene terephthalate and similar materials, whereby an array of molded articles is reconfigured into a single row.

2. Summary of the Prior Art

The use of polyethylene terephthalate (hereinafter referred to as "PET") and similar materials as the materials of choice in the formation of numerous injection molded articles is well known in the art. For example, in the bottle and container industry, the blow molding of injection molded PET preforms has gained wide acceptance, and is experiencing strong growth. Among the reasons for this is the fact that PET and similar materials offer a wide range of desirable properties. Specifically, PET materials generally evidence high strength, good clarity, and low gas permeation characteristics. Further, PET materials are comparatively easy to recycle. Accordingly, they are desirable for use in retail packaging applications.

In systems and apparatus for the injection molding of articles/preforms of the type alluded to above, a mold and a molten material transport means are commonly provided. The mold typically includes a first cavity extending inwardly from an outer surface of the mold to an inner end, an article formation cavity, and a gate connecting the first cavity to the article formation cavity. The gate defines an inlet orifice in the inner end of the first cavity, and an outlet orifice which opens into the article formation cavity.

SUMMARY OF THE INVENTION

The primary aspect of the invention is to provide a product handling device having a serpentine channel having a first end and an outlet end in which sections thereof correspond to an arrangement of an array of molding cores of an injection mold, the serpentine channel defined within a plate and arranged to receive, in use, preforms presented thereto in a pattern of said array. The device further includes a drive mechanism positioned relative to the channel, the drive mechanism including drive means arranged to advance preforms, located in use within the serpentine channel, towards the outlet end, whereby preforms egress from outlet end of the channel as a single row of preforms.

Another aspect of the present invention relates to a method of converting a two-dimensional array of preforms into a one dimensional row of preforms in a singulator having a serpentine channel, the method comprising the steps of placing the two-dimensional array of preforms into corresponding sections of the serpentine channel, engaging the preforms with a mechanically driven drive member to urge the preforms through the serpentine channel, and from an outlet of the serpentine channel egressing the preforms from the singulator as a row of preforms.

The foregoing is achieved by providing an injection molding machine which comprises a plurality of preform mold cavities for the formation of molded articles therein. Following the molding process, the preforms are placed in the singulator so that each preform may be passed inline, and alternatively subjected to further processing by such devices as laser cutting of an elongated gate vestige, or automated preform inspection, etc.

DETAILED DESCRIPTION OF THE PREFERRED EMBODIMENTS

Figure 5:
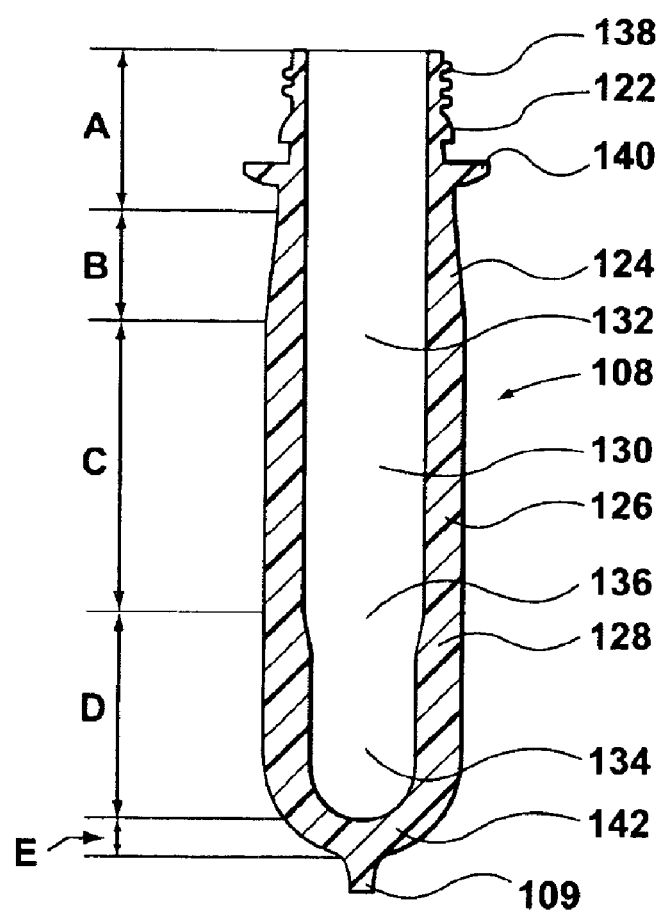
FIG. 5 is a detailed cross-sectional view of a typical preform

Referring first to FIG. 5 which shows a blank 108, also termed preform, of a substantially amorphous thermoplastic material, preferably PET, having a mouth portion 122, a substantially conical portion 124 extending from the mouth portion, a substantially cylindrical portion 126, and a region of material 128 which, when forming the blank 108 into a container, forms the bottom of the container. The blank 108 has a central cavity 130 with a substantially cylindrical upper portion 132 and a substantially cylindrical lower portion 134, whose circumference is smaller than that of the upper portion 132. The transition between the upper and lower portions 132, 134 of the central cavity is a substantially conical transition portion 136. The cylindrical lower portion 134 is closed at its bottom, which is bulging outwards and comprises an elongated vestige or sprue 109. It is this elongated vestige 109 that will be severed from the preform 108 because it exhibits high crystallinity.

The preform 108 thus serves as starting material in the making of a blow-molded container for example a reusable bottle for beverages.

The mouth portion 122 has a threaded portion 138 and an annular gripping portion 140. The material forming the mouth portion 122 is designated A in FIG. 5. The conical portion 124 encloses the substantially cylindrical upper portion 132 of the central cavity of the blank 108. The cone of the conical portion 124 results from an increase of the thickness of this portion towards the bottom of the blank 108. The material of the blank 108 forming the conical portion 124 is designated B in FIG. 5.

The proximal part, with respect to the bottom of the blank 108, of the substantially cylindrical upper portion 132 of the cavity 130 is defined by a wall having a substantially uniform wall thickness in all parts of the cylindrical portion 126. The region of the substantially cylindrical portion is marked C in FIG. 5.

The region of material 128, which after reshaping of the blank 108 is intended to constitute the bottom of the container, has an increased wall thickness in the region of the transition portion 136 of the cavity of the blank 108, and maintains this wall thickness substantially throughout the entire region of the substantially cylindrical lower portion 134 of the cavity. The wall thickness of the blank 108 thereafter decreases in the closed bottom of the blank to have its minimum thickness in a central region of material 142 in the bottom of the blank 108. Reference D indicates the material of the blank 108 which in the resulting container is reshaped to form part of the bottom of the container, while reference E indicates the material of the blank 108 which substantially retains its shape when forming the container.

Figure 1A:
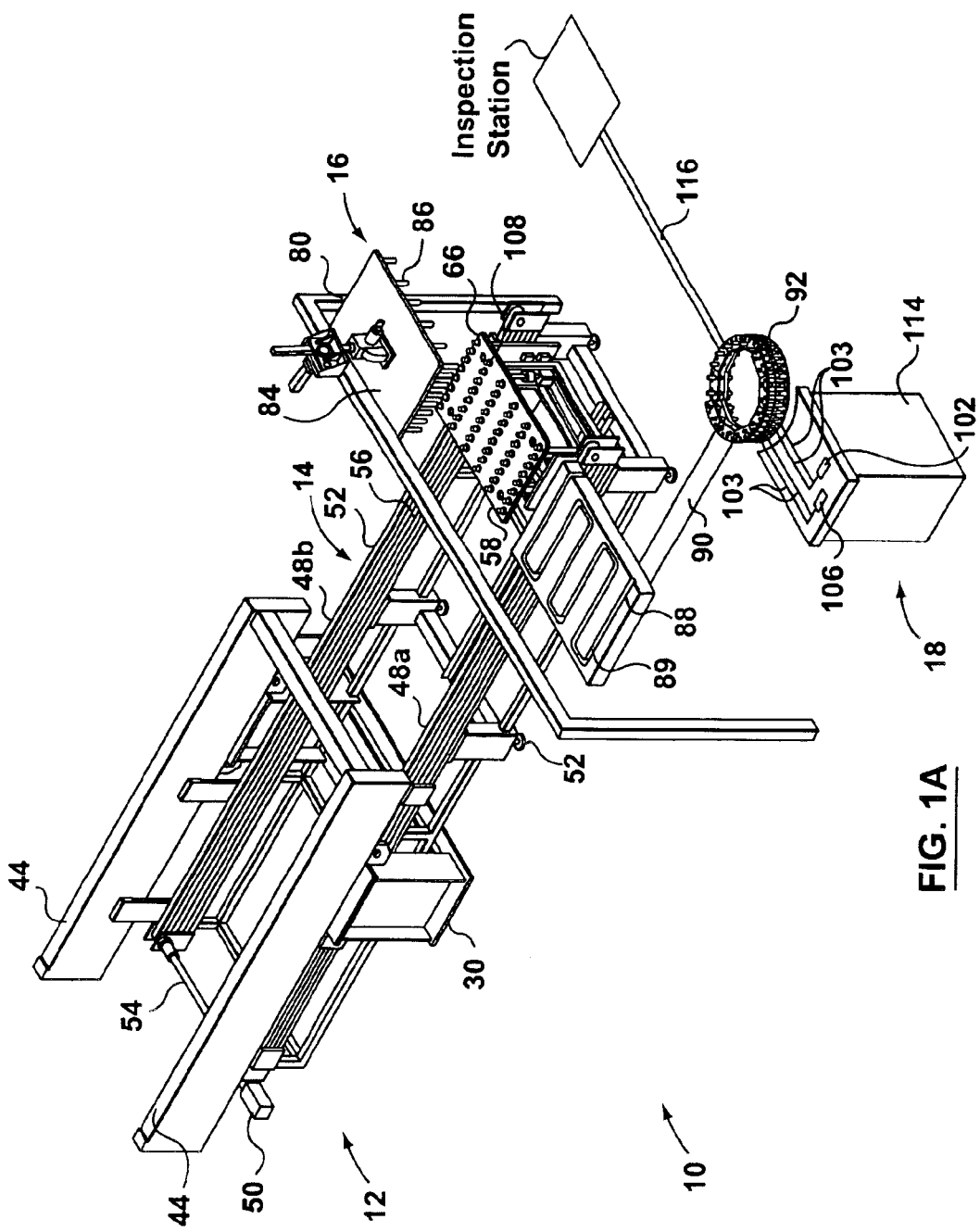
FIG. 1A is a simplified isometric view of an injection molding machine base in accordance with the present invention.
Figure 1B:
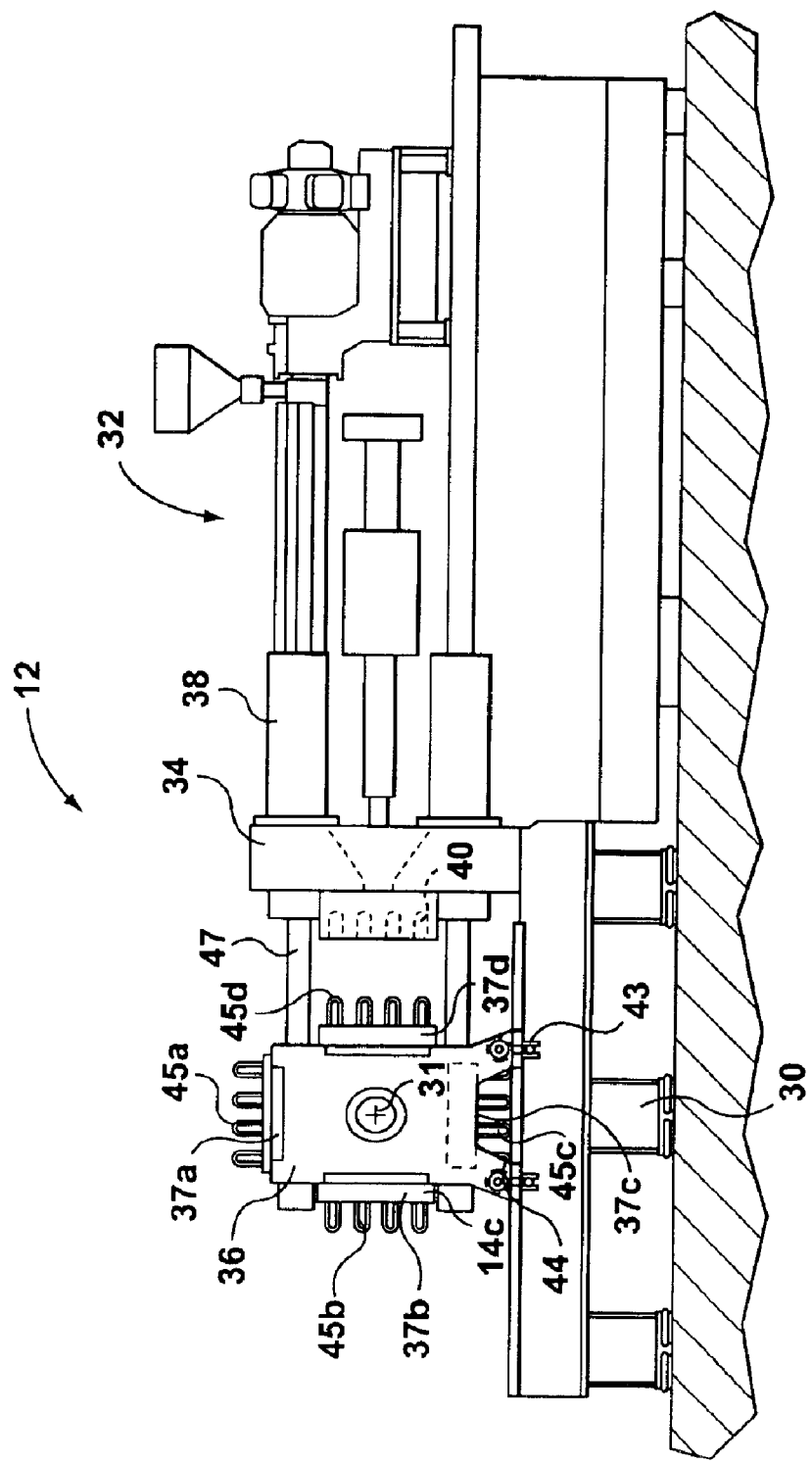
FIG. 1B is a simplified operator side view of an injection molding machine in accordance with the present invention.

Referring now to FIGS. 1A and 1B, an injection molding system 10 according to the present invention is generally shown. The injection molding system 10 is comprised of an injection molding machine 12, a transport subsystem 14, a pick and place robot 16, a laser cutting station 18 and an inspection station (not shown). All of these subsystems work together to form a high speed manufacturing process for the production of injection molded articles, for example PET preforms 108.

In the preferred embodiment, the injection molding machine 12 is an index type machine with a rotary turret 36 for the production of PET preforms 108. As one skilled in the art will recognize however, any type injection molding machine may easily be adapted for use with the present invention.

Injection molding machine 10 generally includes a rotary turret 36 with a plurality of movable mold halves 37a–37d, a stationary mold half and platen 34 and injection unit 32, all positioned on base 30.

Injection molding system 10 may be used for molding a variety of different types of articles and accordingly, is not limited for use with any particular type of article. Preforms are referred to throughout this description by way of example only.

While the rotary turret 36 is shown throughout this description as rotatable on a horizontal axis, and this is the preferred embodiment, it is feasible that a similar design of a movable turret block providing the clamping action may be provided which is rotatable on a vertical axis. Accordingly, this invention is not considered limited to the horizontal axis feature.

As shown in FIG. 1B, rotary turret 36 is preferably longitudinally movable on base 30 via a set of bearings blocks 43 attached to the bottom of a pair of turret fittings (not shown). Base 30 includes linear bearings 44 which engage bearing blocks 43 and counteract upward forces and tipping forces that may act on the turret block assembly. Rotary turret 36 is rotatable preferably by a rotational drive (not shown) in communication with belts and pulleys, preferably an electric servo drive motor and preferably on a horizontal axis H through arcuate sectors preferably of substantially 90 degrees. Preferably, the rotational drive is connected via a belt drive (not shown) to axis (not shown) for rotating the rotary turret 36, as shown in FIG. 1B, while the electric servo drive motor is preferably mounted on one of turret fittings (not shown) extending from base 30.

As shown in FIG. 1B, rotary turret 36 includes a plurality of movable mold halves, i.e. movable mold halves 37a–37d each of which includes a plurality of mold cores 45a–45d, respectively, each set having at least one mold core, adapted for engagement with a set of mold cavities 40, each set including at least one mold cavity and located in stationary mold half and platen 34. Preferably, four movable mold halves or faces 37a–37d are provided on rotary turret 36, although any number supportable by the size of the rotary turret 36 can be used. Sets of mold cores 45a–45d are adapted to be rotated into horizontal and vertical alignment with sets of mold cavities 40.

Referring still to FIGS. 1A, 1B, rotary turret 36 includes sets of ejector pistons or stripper rings (not shown), and a system for the operation thereof, which operate on sets of mold cores 45a–45d and strippers positioned on movable mold halves 37a–37d, respectively. Accordingly, sets of ejector pistons or stripper rings (not shown) are positioned within rotary turret 36 and parallel to sets of mold cores 45a–45d and perform the function of stripping the mold cores of finished molded articles, for example, preforms, such as those shown in FIGS. 4 and 5. Each movable mold half 37a–37d and platen 34 includes at least one ejector piston in each set (not shown) for stripping finished articles from sets of mold cores 45a–45d. For the detailed design of the ejector piston or stripper ring system for use with sets (not shown), reference is made to U.S. Pat. No. 5,383,780, issued Jun. 24, 1995, to the assignee of the present invention, for incorporation by reference of a design of the ejector piston or stripper ring system, particularly column 4, line 29, to column 7, line 6, and FIGS. 1–8. Preferably, the ejector piston or stripper ring system is actuated via the hydraulic services supplied to the rotary turret 36, as discussed below. The hydraulically actuated ejector piston or stripper ring system actuated by on board hydraulic services is the preferred design, however, other designs may be used.

Rotary turret 36 is movable backward and forward along linear bearings 44 on base 30 via piston/cylinder assemblies 38 positioned in stationary mold half and platen 34, as shown in FIG. 1B. Preferably four piston/cylinder assemblies 38, as shown in FIG. 1B are used which are positioned in the corners of stationary mold half or platen 34. Each piston/cylinder assembly 38 is attached to tie bars 47, respectively, which tie bar 47 acts as the piston shaft. Accordingly, tie bars 47 extend from the piston/cylinder assemblies 38 and are connected at an opposite end to rotary turret 36. In order to move rotary turret 36 backward and forward relative stationary mold half and platen 34, pressurized fluid is forced into cylinders assemblies 38. The side of the cylinder assemblies 38 in which pressurized fluid is forced against, determines the direction in which rotary turret 36 moves relative stationary mold half and platen 34, that is, either into an open or closed position. Tie bars 47 pass through the turret fittings 46 and are attached thereto via retaining nuts.

Services, not shown in FIG. 1B, are provided to rotary turret 36 via a rotary union 31. Accordingly, as rotary turret 36 rotates, services are continuously supplied to the movable mold halves 37a–37d. Such services include the supply of electricity, pressurized fluid, cooling fluids, and hydraulic fluids, etc. For using these services, rotary turret 36 also includes the required circuitry and control valves (not shown) on board and movable and rotatable with the turret block.

Injection unit 32, preferably in the form of a reciprocating screw injection unit, is connected with stationary mold half and platen 34 positioned on base 30 for providing melt to the mold cores for molding. Injection unit 32 is preferably movable into and out of engagement with stationary mold half and platen 34 by means of carriage cylinders (not shown) on rollers and hardened ways, similar to as described above for use with rotary turret 36.

Still referring to FIGS. 1A, 1B, the transport subsystem 14 comprises an inside and outside track 48a and 48b mounted to the base 30 and running from under the rotary turret 36 to a position of easy access by the pick and place robot 16. A motor 50 is attached to one end of the inside track 48a which is in communication with a shaft 54 which runs between the inside and outside track 48a and 48b. Attached at each end of the shaft 54 is a pair of belts 52 which run the entire length of the tracks 48a and 48b. Attached to the inside surface of each track 48a and 48b is a second pair of linear bearings 56 which interface with a plurality of bearing blocks 60 (FIG. 2) rigidly affixed to a shuttle table 58. Each belt 52 is attached to the shuttle table 58 such that the shuttle table 58 is operatively positioned (back and forth) through the use of the motor 50 along tracks 48a and 48b. In this arrangement, the shuttle table is controllably positioned beneath the rotary turret 36 to accept the molded preform 108. Once the shuttle table 58 is filled with preforms 108, it is operatively positioned at a far end of the tracks 48a and 48b for easy access by the pick and place robot 16.

Figure 2:
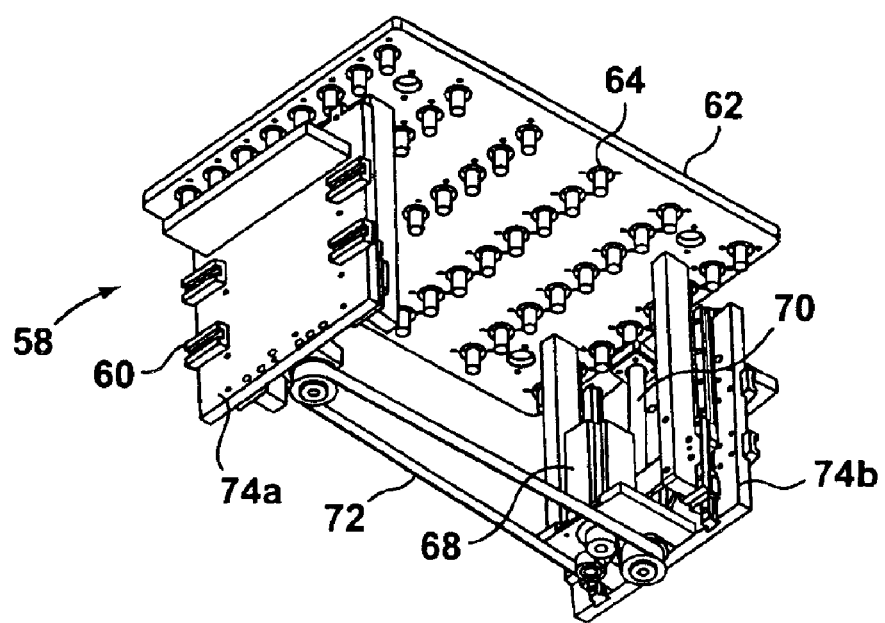
FIG. 2 is an isometric view of the underside of the shuttle table in accordance with the present invention.

Referring now to FIG. 2, the shuttle table 58 comprises a horizontal surface 62 with a plurality of holes 64 arranged to interface with the movable mold halves 37a–37d of the rotary turret 36. Inserted in each hole 64 is a spacer 66 sized to accept the molded preform 108. In the preferred embodiment, the spacers are made from a soft plastic material to minimize the scratching of the preform 108 that may occur during the handoffs from the shuttle table 58.

In the preferred embodiment, the shuttle table 58 must translate upwardly to interface with and catch the plurality of molded preforms 108 when they are released by the rotary turret 36. To accomplish this motion, a servo-motor 68 is mounted beneath the horizontal surface 62 and in communication with a pair of ball screws 70. Each ball screw 70 is attached to opposite ends of the horizontal surface 62 and grounded to an inside and outside support 74a and 74b. A second belt 72 runs between the ball screws 70 such that the servo-motor 68 controls both ball screws 70 for raising and lowering the horizontal surface 62 of the shuttle table 58.

Once the shuttle table 58 has received a plurality of preforms 108, the table 58 moves away from the injection molding machine 12 and aligns with the robot 16. The robot 16 comprises a frame 80 which carries a pick-up table 84 along a trackway 82. The pickup table 84 interfaces with the shuttle table 58 with a plurality of air operated fingers 86 which are inserted into each preform 108. The pick up table 84 is moved under precise control in a manner similar to the way the shuttle table 58 is moved and therefore won't be further described herein. In the preferred embodiment, once the air operated fingers 86 are positioned inside the preforms 108, air is communicated to the fingers 86, causing them to expand and grab on the inside surface of the preforms 108. There are myriad methods for picking up the preforms 108, and the forgoing is just an example of one of these methods and should not be read to limit the scope of the invention.

Once the plurality of preforms 108 in the form of an array are retrieved by the pick up table 84, the table translates to a distal location so that the preforms are aligned with a singulator 88. The singulator 88 of FIG. 1A is shown in more detail in FIG. 7, as having a flat plate 200 with a continuous serpentine groove 89 machined therein, the plate 200 is preferably made from Derlin™ a polyoxymethylene made by Dupont. The pitch between straight parallel sections of the serpentine channel corresponds to a pitch between columns in a mold plate. The serpentine groove 89 is designed to accept a plurality of different preform sizes. Once the preforms 108 are properly seated in the groove 89 by the pick up table 84 (FIG. 1A), the air in the fingers 86 (FIG. 1A) is removed and the plurality of preforms 108 are released into the groove 89. The array of preforms may also be delivered thereto by other equivalent device to the pickup table 84 such as an end-of-arm-tool on a robot. The serpentine channel 850 is dimensioned such that an annular gripping portion 140, formed in the molded article, is too large to slip into the serpentine channel, i.e. the annular gripping portion of the preform rests on an upper surface 200 of the singulator. The singulator 88 further includes a drive chain 202 driven by a drive motor 204. The drive chain can, for example, be either of a rubber construction or a linked construction. The drive chain 202 is a continuous drive chain that is linked to the drive motor 204 through at least one sprocket 208 or the like. The drive chain therefore follows the serpentine channel 89 along a substantial proportion (if not the entire length of) its path through the plate 200. Guides 210 and free-rotating sprockets 206 define a path of the drive chain adjacent to the serpentine channel. In order to advance preforms located in the serpentine channel 89, drive members (such as paddles) 212 are coupled to the drive chain 202, such drive paddles preferably being of a plastic material with some limited elastic properties. The drive paddles 212 extend across the surface of the serpentine channel 89. The drive paddles therefore engage against a neck or upper surface of the preform to urge, under the control of the motor drive 204, the array of preforms along the serpentine channel 89 and into a linear row of preforms that egress from the singulator 88 and into the conveyor 90 (FIG. 1A) and are moved onwards for further handling or processing. The drive chain can include one or more drive paddles 212. In operation, the drive motor is preferably intermittent stop-start mode and is controlled using feedback from proximity sensors 216 mounted to the plate 200 and proximity targets mounted to the driven sprocket 208.

Figure 8:
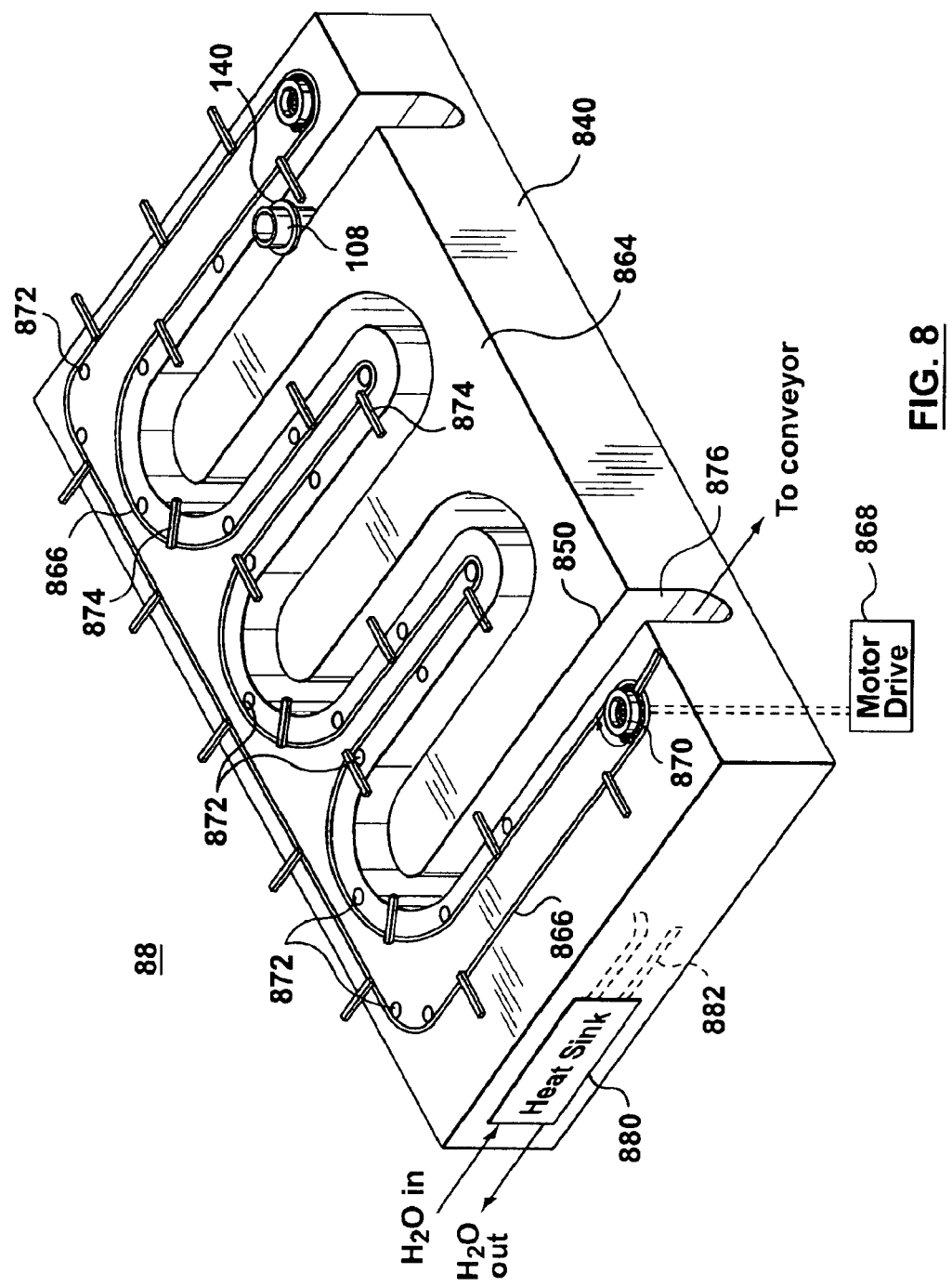
FIG. 8 is an isometric view of the topside of the singulator in accordance with an alternative embodiment of the present invention.

Reference is now made to FIG. 8 in which an alternative embodiment of the singulator 88 of FIG. 1A is shown. The singulator 88, previously described as a flat plate 840 containing a continuous serpentine channel 850, may be made from a machined plate of steel or aluminum or, alternatively, it can be constructed in a box-like fashion. The serpentine channel is configured to receive an array of preforms delivered thereto by the pick-up table 84 or other equivalent device, such as an end-of-arm-tool on a robot. In other words, a pitch between straight parallel sections of the serpentine channel corresponds to a pitch between columns in a mold plate. The serpentine channel 850 is dimensioned such that a annular gripping portion 140, formed in the molded article, is too large to slip into the serpentine channel, i.e. the annular gripping portion of the preform rests on an upper surface 864 of the singulator. It is preferably that the majority of the body portion of the preform is contained within the channel. The singulator 88 further includes a drive chain 866 driven by a drive motor 868. The drive chain can, for example, be either of a rubber construction or a linked construction. The drive chain 868 is a continuous drive chain that is linked to the drive motor 868 through at least one sprocket 870 or the like. The drive chain therefore follows the serpentine channel 850 along a substantial proportion (if not the entire length of) its path through the plate 840. Rollers, small free-rotating sprockets 872 define a path of the drive chain adjacent to the serpentine channel. In order to advance preforms located in the serpentine channel 850, drive members (such as paddles) 874 are coupled to the drive chain 866, such drive paddles preferably being of an plastic material with some limited elastic properties. The drive paddles 874 extend across the surface of the serpentine channel 850. The drive paddles therefore engage against a neck or upper surface of the preform to urge, under the control of the motor drive 868, the array of preforms along the serpentine channel 850 and into a linear row of preforms that egress from the singulator 88 and are moved onwards for further handling or processing, preferably, by a conveyor system (not shown) coupled to an outlet 876 of the singulator 88. The drive chain can include one or more drive paddles 874. The singulator 88 may include a heat sink or other cooling system 880 (e.g. a water-cooled system including channels or piping 882 located through the singulator 88).

Although the drive chain 866 is shown to be on the surface 864 of the singulator 88, it may also be included beneath the surface should a box-like construction be employed. Indeed, internal mounting may be preferably from a safety handling perspective.

Figure 3:
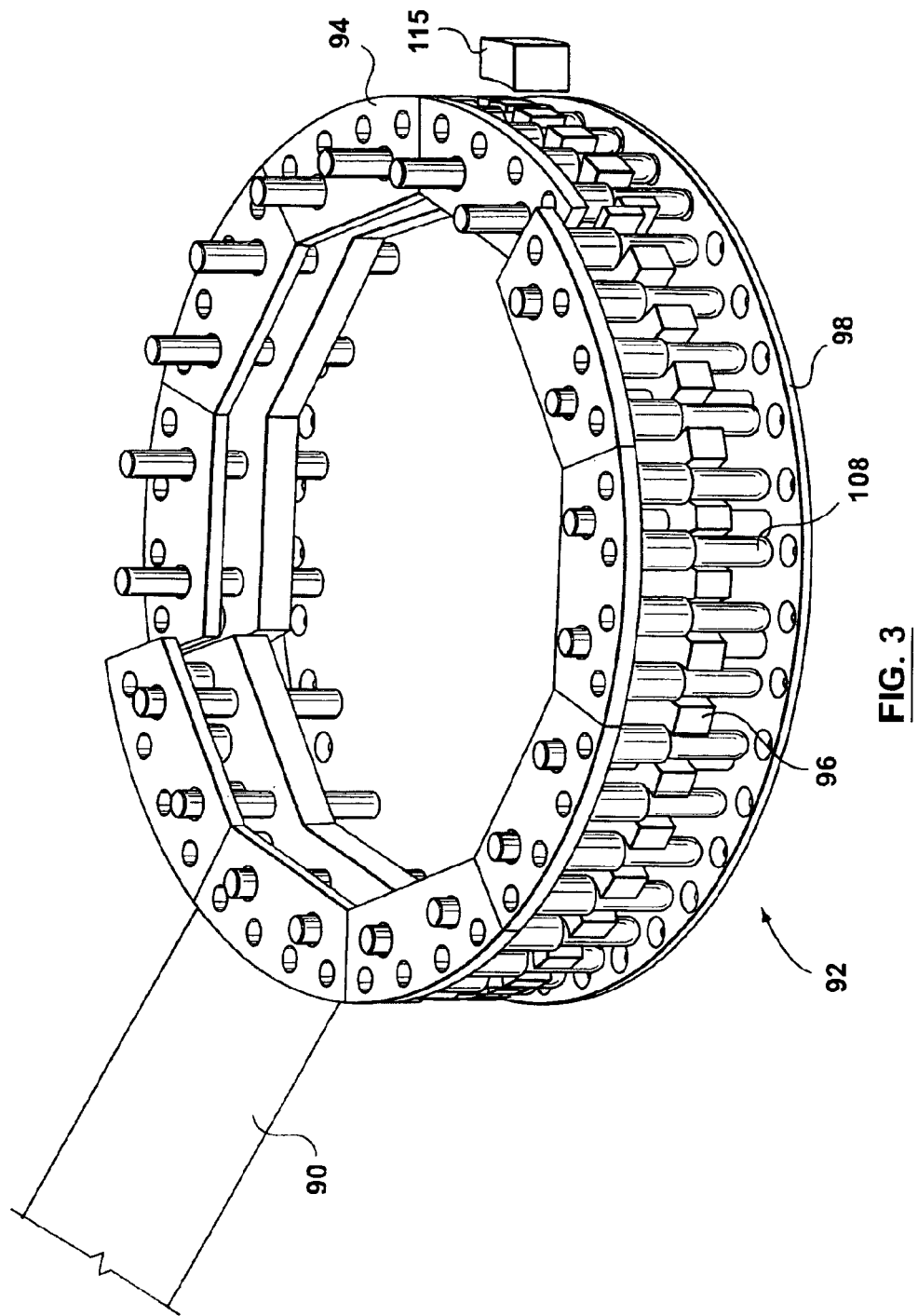
FIG. 3 is an enlarged isometric view of the laser cutting station with an array of preforms.
Figure 4:
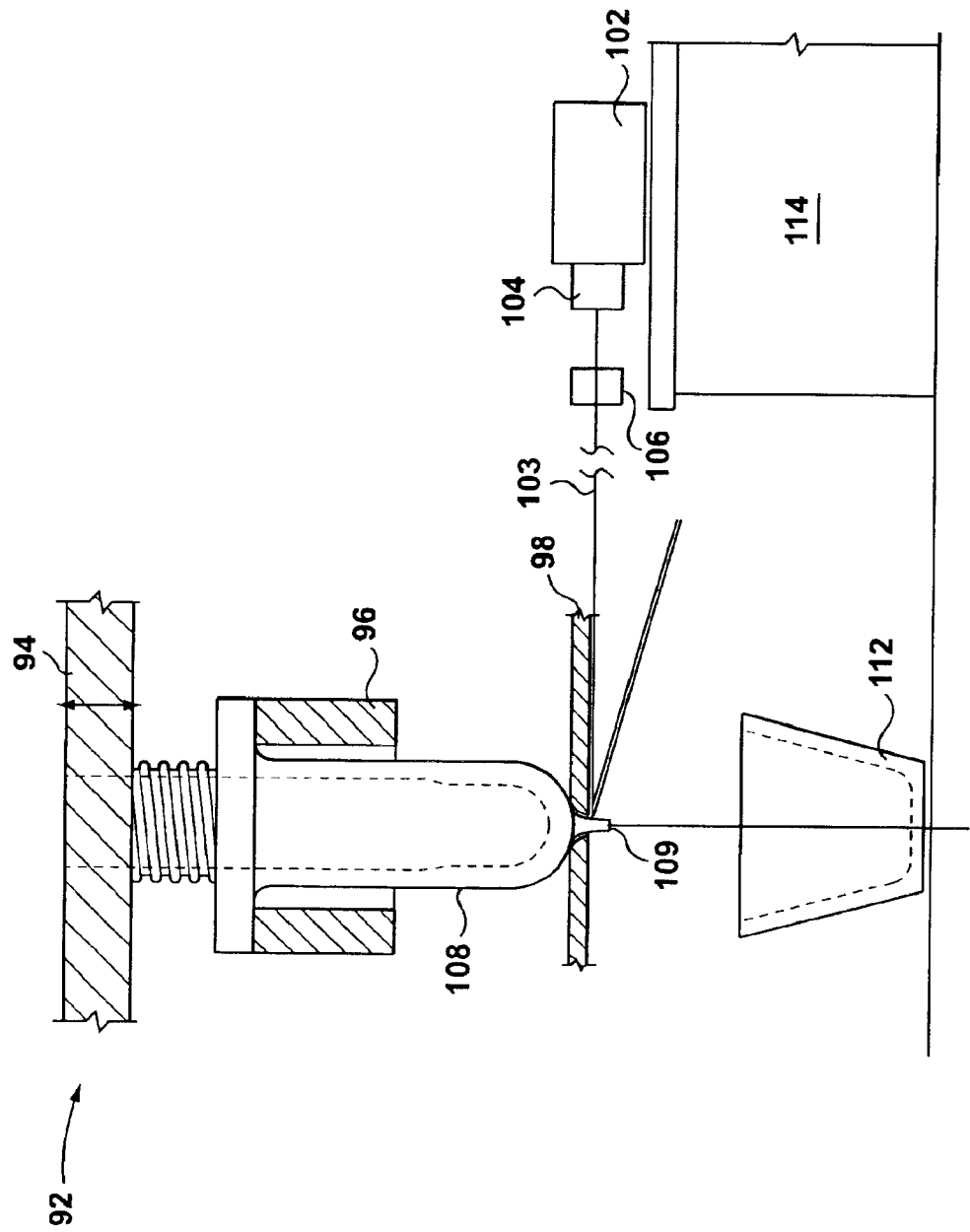
FIG. 4 is a partial detail view of the laser cutting station.

Referring to FIGS. 3 and 4, the preforms 108 travel down the conveyor 90 to the laser cutting station 18. The laser cutting station 18 comprises a rotary track 92 which accepts the preforms from the conveyor 90 and spins them in a circular fashion past a plurality of laser beams 103. The rotary track 92 comprises a circular holder 96 with a plurality of pockets to accept the preforms 108 from the conveyor 90. The rotational speed of the rotary track 92 is matched with the linear speed of the conveyor 90 so that preforms 108 are quickly and easily transferred into the pockets of the circular holder 96. As the rotary track 92 rotates (and before the preform aligns with the first laser beam 103), a segmented top plate 94 is lowered into contact with the top surface of the preform 108 and forces the bottom of the preform 108 to interface with a lower shield 98. In this arrangement, the elongated vestige 109 is now properly aligned with the plurality of laser beams 103 as they travel around with the rotary track 92. The elongated vestige 109 travels past each laser beam 103 in rapid succession, thereby severing the vestige 109 from the preform 108. The now severed vestige 109 drops into a reclamation bin 112, where the vestige 109 will be later re-melted and recycled.

The shield 98 is specifically designed to both protect the main body of the preform 108 from damage by the laser and also maintain a given length of remaining vestige. Testing has shown that without the shield 98, energy from the laser 102 can cause inadvertent damage to the body of the preform 108. In addition, international quality inspection criteria dictate the required length of any remaining vestige. Using the shield 98 insures the laser cuts the elongated vestige 109 at the proper location.

Figure 6:
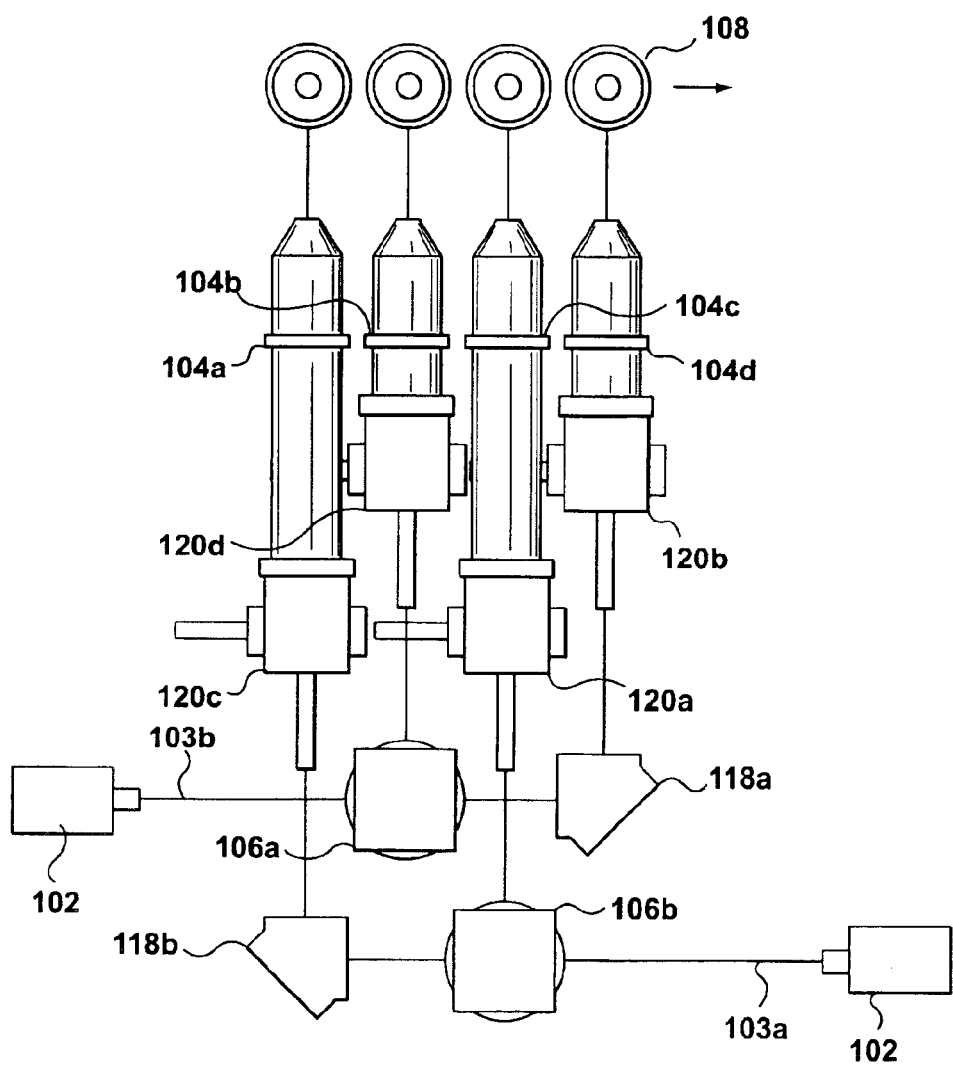
FIG. 6 is a top plan view of the laser system layout.
Figure 7:
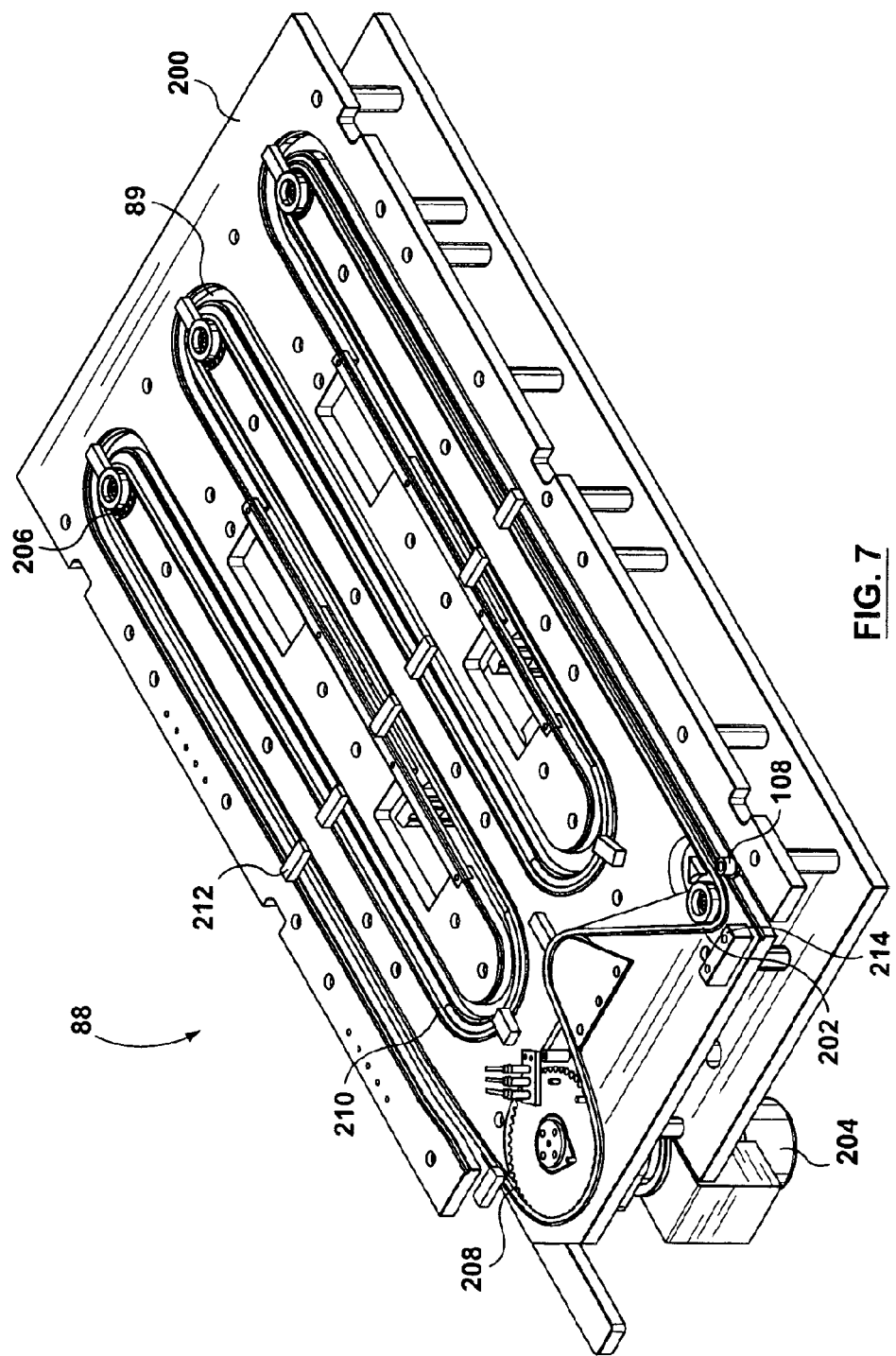
FIG. 7 is an isometric view of the topside of the singulator in accordance with the present invention.

Referring to FIG. 6, the various optical components which comprise the laser cutting setup are generally shown. Two lasers 102 are each aligned such that the laser beam passes first through a splitter 106a and 106b respectively. The splitters 106a and 106b are designed to reflect half of the laser beam power at 90 degrees from the entering beam, and allow the other half of the laser beam power to continue on to a mirror 118a and 118b where the remaining laser beam power is also reflected at 90 degrees from the entering beam. In the preferred embodiment, the optimum laser cutting set up was found to be two 500 W $CO_2$ lasers focused inline with the elongated vestige 109. In this arrangement, four laser beams, each with approximately 250 watts of power are transmitted to a bank of focusing lenses 104a–104d. Positioners 120a–120d are attached to each lens 104 and allow for minute adjustments to the focused laser beam for machine set.

A by-product of the laser cut is a very fine dust which tends to accumulate on the outside surface of the preform. To remove this dust, a brush 115 is mounted in the path of the preforms 108 as it passes to an unload conveyor 116. Alternatively, or in combination, forced air could be blown over the preforms as the cut is made, or an electrical charge could be placed on the preforms to repel the flying plastic dust.

The unload conveyor 116 accepts the preforms 108 in a linear fashion after they have been cut and transfers them to an inspection station (not shown) where each preform is inspected for compliance with quality control standards.

It is to be understood that the invention is not limited to the illustrations described and shown herein, which are deemed to be merely illustrative of the best modes of carrying out the invention, and which are susceptible of modification of form, size, arrangement of parts and details of operation. The invention rather is intended to encompass all such modifications which are within its spirit and scope as defined by the claims.

What is claimed is:

1. An injection molded product handling device comprising:
    a serpentine channel, the serpentine channel having a first end and an outlet end, sections of the serpentine channel corresponding to an arrangement of a two-dimensional array of the injection molded products to be received therein, the serpentine channel configured within a plate and arranged to receive the injection molded products therein; and
    a drive mechanism positioned approximate the channel, the drive mechanism including at least one drive paddle configued to engage a portion of the injection molded product around the serpentine path to advance the injection molded products within the serpentine channel towards the outlet end, whereby the injection molded products egress from the outlet end of the device as a row.

2. The product handling device of claim 1, wherein the drive mechanism includes a sprocket and chain drive.

3. The product handling device of claim 1, further including a cooling system coupled to the plate, the cooling system configured to cool the injection molded products passing through the serpentine channel.

4. The product handling device of claim 1, wherein the serpentine channel is dimensioned to prevent an annular gripping portion of an injection molded preform from slipping below a surface of the plate.

5. The product handling device of claim 1, wherein the drive paddle is coupled to a continuous drive chain of the drive mechanism, the continuous drive chain located adjacent the serpentine channel and configured such that the drive paddle extends across the serpentine channel to engage an upper portion of an injection molded preform in the serpentine channel.

6. The product handling device of claim 5, further comprising (i) a rotary table, and (ii) a conveyor attached to the outlet end of said serpentine track and configured to transmit the preforms to said rotary table, said rotary table moving configured to move the preforms past a laser station at a predetermined rotational speed.

7. The product handling device of claim 5, further comprising a conveyor attached to an end of said serpentine track and configured to transmit of the preforms to a preform inspection system.

8. The product handling device of claim 1, wherein the two-dimensional array of injection molded products corresponds with an arrangement of molding cores of an injection mold.

9. The product handling device of claim 1, wherein the two-dimensional array of injection molded products corresponds with an arrangement of fingers of a pickup table.

10. The product handling device of claim 1, wherein the two-dimensional array of injection molded products corresponds with an arrangement of molded product holding devices on a end-of-arm-tool.

* * * * *